June 3, 1947.  J. G. ZUBER  2,421,449
HARDNESS MEASURING INSTRUMENT
Filed May 18, 1942
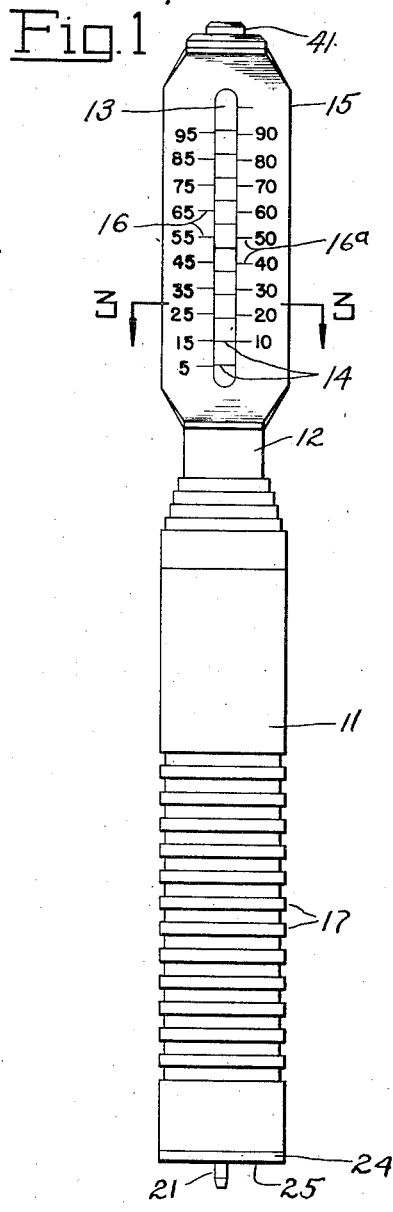
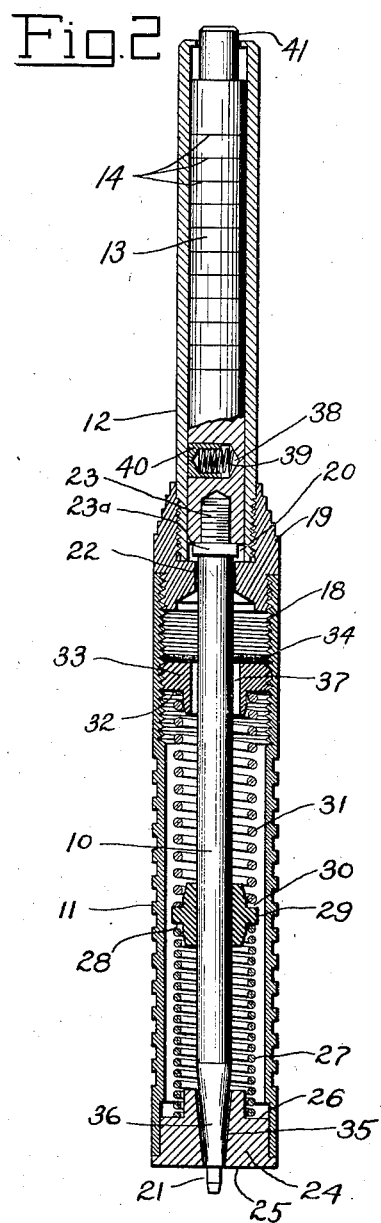
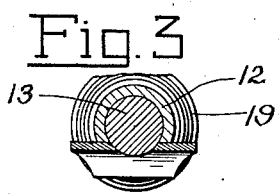
INVENTOR
JOHN G. ZUBER
BY Eugene M. Giles
ATTY.

Patented June 3, 1947

2,421,449

UNITED STATES PATENT OFFICE 2,421,449

HARDNESS MEASURING INSTRUMENT

John G. Zuber, Chicago, Ill.

Application May 18, 1942, Serial No. 443,420

7 Claims. (Cl. 73—81)

My invention relates to instruments for measuring the hardness or compressibility of materials, such as soft rubber, and has reference more particularly to a device in which a movable indicator of hardness or compressibility is operated directly by a test prod or depressor by which the hardness or compressibility is determined.

In the measurement of the hardness or compressibility of materials such as soft rubber, extreme sensitiveness and accuracy of operation is required because of the slight compression of the material that occurs in testing and the minute variations in such compression that should be shown by the indicator. Accordingly, it is essential not only that the compressing force by which the measurement of compressibility is ascertained should be exact but also that all factors, such as appreciable or varying friction, and any linkage, gearing or the like, which might contribute to inexact responsiveness of the test prod and indicator to variations of compressibility, should be avoided.

The principal objects of my invention are to provide a simple, accurate and reliable gauge for measuring the hardness or compressibility of materials such as soft rubber; to insure precision of compression force is to avoid any appreciable friction or variation of friction that might interfere with the accuracy of the measurements; to impart movement to the indicator directly from the test prod without any intermediate gearing, linkages or the like which would introduce possible factors of inaccuracy to the indicator; to provide a convenient application of a vernier scale by which slight variations of hardness or compressibility may be readily ascertained; and to permit reading of the measurement after removal of the gauge from the tested material—these and other objects being accomplished as pointed out hereinafter and as shown in the accompanying drawing in which:

Fig. 1 is a front view of the gauge;

Fig. 2 is a central longitudinal sectional view of the gauge;

Fig. 3 is a sectional view on the line 3—3 of Fig. 1.

In the drawing, which shows a preferred embodiment of my invention, the reference numeral 10 indicates a test pin which is freely movable axially in a cylindrical barrel 11 which has a detachable cylindrical extension 12 at the upper end slidably containing a plunger 13 which has vernier graduations 14 exposed along one side of the extension 12 through an elongated opening 15, to cooperate with companion vernier graduations 16 and 16a along the sides of the opening 15 to provide an easy reading of the measurement obtained by the gauge.

The barrel 11, which is preferably circumferentially ribbed as at 17 on the outer side or otherwise formed to permit secure grasping of the barrel in the testing operation, is internally threaded at the upper end as at 18 for securing thereto of a plug 19 which has an internally threaded cavity 20 at its outer end to receive the lower threaded end of the cylindrical extension 12 which is thus rigidly secured to the barrel 11 in axial alignment therewith.

The test pin 10, which extends throughout the length of the barrel 11, is formed with a small test prod 21 at the lower end which normally projects a predetermined distance from the lower end of the barrel 11, and this test pin 10 projects at its upper end loosely through an opening 22 of the plug 19 into the cavity 20 to abut against the hardened head 23a of a member 23 in which is threaded securely the lower end of the plunger 13.

The lower end of the barrel 11 is closed by a plug 24 through which the lower end of the pin 10 projects, and this plug 24, which is secured preferably permanently in the lower end of the barrel is provided with a flat outer face 25 to engage the surface of the work in testing.

The inner end of the plug 24 is formed with a spring seat 26 for the lower end of a coil spring 27, the upper end of which engages in the bottom spring seat 28 of a collar 29 that is fixed on the pin 10 and this collar has an upper spring seat 30 to receive the lower end of another coil spring 31, the upper end of which engages the spring seat 32 of a disk-like plug 33 which has a threaded engagement with the threading 18 of the barrel for adjustably securing the plug 33 in place in the barrel. The pin 10 projects through an opening 37 of the plug 33 and this opening 37 is amply large to avoid contact of the pin with the plug 33.

After this plug 33 is set in the proper position for accurate testing it is preferably secured in that position against any possible displacement by an annular filling of sealing wax or cement in the marginal corner between the top of the plug 33 and the barrel 11 as indicated at 34.

The opening 35 of the bottom plug 24 through which the pin 10 extends is tapered as shown and the portion of the pin within this opening is correspondingly tapered as at 36 and fits sufficiently loosely in the opening 35 in the normal projecting position of the test prod 21 so that there is no frictional resistance at this place to initial movement of the pin 10 and as the pin 10 is elevated in the testing operation the clearance between the tapered portion 36 of the pin and the tapered opening 35 increases so that frictional clearance is maintaining at all times.

The upper spring 31 is preferably, although not necessarily, slightly stronger than the lower spring 27 and these springs are arranged so that both are at all times under compression, it being understood of course that as the pin 10 is moved upwardly to the upper limit of its movement the compression of the upper spring gradually increases and that of the lower spring gradually diminishes.

In the normal position of the pin 10 the tension of the opposed springs 27 and 31 is equalized and serves to hold the pin 10 in substantially a balanced floating position, the springs being so constructed and arranged that in the balanced floating position the test prod 21 projects beyond the face 25 the predetermined distance required for the instrument's intended measuring purposes.

In view of the clearance between the pin 10 and the openings 22, 37 and 35 the pin 10 is at all times supported solely by the springs 27 and 31 and otherwise entirely free to move axially without contact with any parts of the instrument except the lower end of the plunger 13 which, as pointed out hereinafter, is arranged to offer such uniform and slight friction that its effect is negligible on the freedom of operation of the pin 10, and accordingly almost frictionless movement thereof and an unusually high degree of accuracy is assured.

The test prod 21 is of the shape which has been established as the standard for hardness measuring instruments of this character and the vernier scale 14, 16 is arranged to accurately indicate the hardness or compressibility of the material to which the test prod is applied as determined by the axial displacement of the pin 10 from the normal position against the resultant resistace of the opposed springs 27 and 31 and it is, of course, necessary that these springs must be very accurately made and the plug 33 properly set so that any testing movement of the pin 10 is in exact accordance with the compression of the tested material.

To obtain the proper degree of extreme accuracy of the springs that is desired for a highly sensitive precision instrument of this character has presented considerable difficulty but I have found that it may be accomplished quite readily by making the springs slightly stronger than required and then by repeated etching of the springs, as for example with acid, and testing thereof, the strength may be reduced in a nicely controlled manner to the exact tension required.

The plunger 13 is fitted in the extension 12 and the contacting surfaces suitably finished so as to substantially eliminate any material normal friction between the plunger and extension that would affect entire freedom of axial movement of the plunger 13 in the extension 12, and this plunger, the hardened end member 23a of which normally rests against the upper end of the pin, is thus free to be moved upwardly by the pin 10 as the latter is displaced in the testing operation, and, of course, the relative movement at such time of the vernier scale 14 with respect to the vernier scale 16 indicates the extent of movement of the plunger 13 and shows the compressibility or hardness of the material tested.

Obviously, the plunger 13 could be omitted and the pin 10 provided with a calibrated portion to indicate in conjunction with a vernier scale 16, 16a, the compressibility of the tested material but the reading would need to be made, many times inconveniently, while the tester was applied on the material and the illustrated structure is preferred as it permits removal of the gauge from the work for reading the measurement.

To this end, while the plunger 13 is free to be moved outwardly by the pin 10, it is a separate part and arranged to remain, after each testing operation, in whatever position it may have been pushed outwardly by the pin 10, until it is returned manually to its normal position of contact with the end of the pin 10 which said pin 10, upon removal of the instrument from the tested material, returns to its position of balance in which it is normally maintained by the springs 27 and 31.

For holding the plunger 13 in any position of outward movement, the plunger is provided with a spring cavity 38 in the side thereof containing a light spring 39 which imposes an outward thrust on a cup-shaped plunger 40 to cause the latter to frictionally engage against the wall of the extension 12 sufficiently to hold the plunger 13 in any position of adjustment. It will be understood that the outer face of the spring plunger 40 is such that it slides easily and with invariable friction along the wall of the extension 12 and that it imposes a sufficiently light friction to have no material effect on the freedom of testing operation of the plunger 10. This light friction and also the weight of the pin, plunger, and upper spring constitute a determined and fixed factor which is taken into consideration as a part of the operation loss and compensated for in the construction of the instrument.

The outer end of the extension 12 is open as shown and the plunger 13 is formed with a reduced terminal portion 41 which projects at all times outwardly from the open end of the extension 12 and after each testing operation and reading of the measurement obtained by the tester, the plunger is returned to its normal position against the end of the pin 10 by merely pushing inwardly on the exposed end 41 of the plunger.

It will be understood that in the normal or zero position of the tester parts the lower graduation of the vernier scale 14 is very slightly below the lower graduation (marked 5) of the vernier scale 16 and the test prod 21 is at rest in its outermost position, and it will be understood that when the lower graduation of the scale 14 is moved upwardly into exact alignment with the lower graduation 5 of the scale 16, this represents the lowest or smallest measurement of hardness or compressibility indicated by the instrument.

In the zero position each succeeding graduation of the vernier scale 14 is progressively farther below the next numbered graduations immediately thereabove of the scales 16 and 16a so that at 10 one-hundredths of the maximum hardness for which the instrument is designed the second or next to the bottom graduation of the scale 14 aligns with the 10 graduation of the scale 16a, at 15 one-hundredths of the maximum hardness the same second graduation of the scale 14 aligns into the 15 graduation of the scale 16, while at 20 one-hundredths and 25 one-hundredths of the maximum hardness the third graduation of the scale 14 aligns respectively into the 20 graduation of the scale 16a and the 25 graduation of the scale 16 and so on until at the maximum hardness the last or uppermost graduation of the scale 14 aligns with the upper unnumbered graduation of the scale 16a. This alignment of the uppermost graduation of the scale 14 into the upper unnumbered graduation of the scale 16a, which represents the maximum measuring capacity of the instrument, indicates no compressibility at the applied load or maximum hardness while the zero position of the instrument represents no hardness.

The spring 31 will, of course, be made of whatever strength is required for the particular type of material for which the gauge is intended to be used so that the measurements indicated by the vernier scale correspond to some unit of measurement appropriate for such type of material. For example, for ordinary soft rubber the standard is 29 ounces with $\frac{3}{32}$ inch diameter prod having $\frac{1}{10}$ of an inch total movement and a spring providing the required 29 ounce resistance at the 100% hardness measurement is employed. For other materials lighter or stronger springs will be employed as required or a different size prod surface may be employed as for example with sponge or foam rubber which is exceedingly soft, a lighter spring or a larger prod surface or both may be employed.

In the operation of this tester, the plunger 13 being in the fully depressed position, the lower end of the gauge is pressed flat against the surface of the material to be tested until the lower surface of the tester makes firm contact with the surface of the material. Thereby the pin 19 and plunger 13 are moved outwardly a distance which depends upon the extent to which the surface of the material yields to and is indented by the test prod 21 and this in turn depends upon the softness of the material. With extremely soft and compressible material the test prod 21 will cause a relatively deep depression in the material and will be pushed outwardly only a slight amount whereas with less compressible material a lesser depression will occur and the test prod will be moved outwardly to a correspondingly greater extent so that the outward displacement of the pin 19 and the reading on the vernier scales 14, 16 and 16a will accurately indicate the softness or compressibility of the tested material.

After the test has been made the tester may be removed, at which time the pin 19 automatically returns to the normal position, whereas the plunger 13 remains in the position to which it has been moved by the test. Thus, the measurement of the test may be read at any time either during or after the test and, after reading thereof, the plunger 13 is pushed back to the normal position in which the gauge is ready for the next testing operation.

Because of the balanced arrangement of the pin 19 and freedom from frictional engagement with the openings 22, 37 and 35 extreme accuracy is insured and moreover by reason of the tapered form of the opening 35 and pin portion 36 the clearance therebetween increases as the pin 19 moves upwardly. This is important as it not only tends to keep the space between these surfaces free of foreign matter that might impair the accuracy of the instrument but it also avoids frictional contact that might occur between these surfaces and impair accuracy if the gauge should be carelessly applied to the work sufficiently nonperpendicularly or otherwise to impose side pressure on the test prod.

Obviously, although the illustrated construction is preferred, the gauge might be constructed with only the spring 31 and with the lower spring 27 omitted, and various other changes and modifications may be made without departing from the principles of the invention, the scope of which is to be determined by the appended claims.

What I claim is:

1. In a testing device of the class described, the combination of a holder having a wall with an outer face for engagement with the material to be tested, said wall having a tapered opening therethrough, a testing member in the holder having a tapered portion loosely extending through said opening and terminating in a test prod which normally projects beyond the aforesaid face of said wall, spring means in the holder and against the tension of which the test prod is yieldingly retractable toward the holder, said tapered portion of the testing member and tapered opening being normally out of contact with one another and increasingly separable annularly as the test prod is retracted.

2. In a device of the class described, the combination of a tubular casing with an exposed face at one end for engagement with the surface of the material to be tested, a tubular extension of smaller cross section threaded into the other end of said casing, a slidable indicator in said tubular extension, a stem in the casing having a test prod at one end which projects outwardly through said exposed face for testing engagement with the material to be tested, coil spring means in the casing encircling the stem and against the tension of which the test prod is resiliently retractable, said stem being resiliently held by said coil spring means in peripherally suspended relation to the casing and having one end abuttable against an end of the aforesaid slidable indicator.

3. In a testing device of the class described the combination of a casing with an exposed face for engagement with the work, an axially movable stem in the casing having at one end thereof a work engaging test prod which projects outwardly through said exposed face, said stem being arranged loosely in said casing with circumferential clearance therearound throughout its length providing frictionally free axial movement, and resilient means in the casing by which the stem is yieldingly held in the frictionally free axially movable position, said casing and stem having respective seats between which said resilient means is interposed and by which said resilient means is held in a frictionally free position of concentricity with the axis of the stem.

4. In a testing device of the class described the combination of a casing with an exposed face for engagement with the work, a spring in the casing and an axially movable stem encircled by the spring and having at one end a work engaging test prod which projects outwardly through said exposed face and is retractable against the tension of said spring, said stem being arranged loosely in said casing with circumferential clearance therearound throughout its length providing frictionally free axial movement and yieldingly held in said frictionally free axially movable position by said spring, said casing and stem having respective seats between which the spring is interposed and by which it is held in a frictionally free position of concentricity with the axis of the stem.

5. In a testing device of the class described the combination of a casing with an exposed face for engagement with the work, a pair of opposed springs in the casing and an axially movable stem encircled by said opposed springs and having at one end a work engaging test prod which projects outwardly through said exposed face and is retractable against the tension of one of the springs, said stem being arranged loosely in said casing with circumferential clearance therearound throughout its length providing frictionally free axial movement and yieldingly held in said frictionally free axially movable position by both springs, said casing and stem having respective seats between which said springs are interposed and by which each of said springs is held in a frictionally free position of concentricity with the axis of the stem.

6. In a testing device of the class described the combination of a casing with an exposed face for engagement with the work, a slidable indicator, an axially movable stem aligned with and abuttable at one end against the slidable indicator and having at the other end a work engaging test prod which projects outwardly through said exposed face, said stem being arranged loosely in said casing with circumferential clearance therearound throughout its length providing frictionally free axial movement, and spring means in the casing by which the stem is yieldingly held in the frictionally free axially movable position, said casing and stem having respective seats between which said spring means is interposed and by which said spring means is held in a frictionally free position of concentricity with the axis of the stem.

7. In a testing device of the class described the combination of an elongated casing with a pair of longitudinally spaced openings and an exposed face at one end concentric with said openings for engagement with the surface of the material to be tested, a stem in the casing extending loosely through said openings and having at one end a test prod which projects outwardly through said exposed face for testing engagement with the material to be tested, and coil spring means in the casing and encircling the stem and against the tension of which the test prod is yieldingly retractable, said stem being held by said coil spring means concentrically in and spaced from said openings, said casing and stem having respective seats between which said coil spring means is interposed and by which said coil spring means is held in a frictionally free position of concentricity with the axis of the stem.

JOHN G. ZUBER.

REFERENCES CITED

The following references are of record in the file of this patent:

UNITED STATES PATENTS

| Number | Name | Date |
|---|---|---|
| 1,483,565 | Adams | Feb. 12, 1924 |
| 1,519,602 | Zimmerman | Dec. 16, 1924 |
| 1,313,233 | Grass | Aug. 12, 1919 |
| 1,777,321 | Meth | Oct. 7, 1930 |
| 1,661,718 | Davis | Mar. 6, 1928 |
| 1,942,982 | Schneider | Jan. 9, 1934 |
| 2,117,985 | Ridenour | May 17, 1938 |
| 1,637,421 | Lipschutz | Aug. 2, 1927 |
| 1,822,662 | Letsch | Sept. 8, 1931 |
| 1,825,491 | Walters | Sept. 19, 1931 |

FOREIGN PATENTS

| Number | Country | Date |
|---|---|---|
| 298,662 | Great Britain | Oct. 12, 1928 |
| 2,186 | Great Britain | 1863 |